United States Patent [19]
McCoy

[11] Patent Number: 5,810,106
[45] Date of Patent: Sep. 22, 1998

[54] VEHICLE DRIVE SYSTEM

[75] Inventor: Gregory A. McCoy, Bristol, Tenn.

[73] Assignee: Stamler Corporation, Millersburg, Ky.

[21] Appl. No.: 404,226

[22] Filed: Mar. 15, 1995

[51] Int. Cl.$^6$ .................................................. B60K 17/356
[52] U.S. Cl. ........................ 180/243; 180/307; 180/308; 180/24.07
[58] Field of Search ..................................... 180/242, 243, 180/305, 307, 308, 24.07, 24.11, 246, 69.6

[56] References Cited

U.S. PATENT DOCUMENTS

| | | |
|---|---|---|
| Re. 28,324 | 1/1975 | Greene . |
| 2,748,879 | 6/1956 | Bailey .................................. 180/24.11 |
| 3,303,901 | 2/1967 | Schou . |
| 3,361,223 | 1/1968 | Bauer . |
| 3,581,682 | 6/1971 | Kontranowski . |
| 3,811,525 | 5/1974 | Stuart . |
| 3,916,625 | 11/1975 | Holtkamp .................................. 60/421 |
| 4,116,294 | 9/1978 | Johnston . |
| 4,133,403 | 1/1979 | Priddy, Jr. . |
| 4,402,181 | 9/1983 | Acker et al. . |
| 4,470,475 | 9/1984 | Carlson . |
| 4,528,871 | 7/1985 | Nembach . |
| 4,554,991 | 11/1985 | Eden . |
| 4,570,741 | 2/1986 | McCoy . |
| 4,702,843 | 10/1987 | Oswald .................................. 280/707 |
| 4,883,141 | 11/1989 | Walker . |
| 5,290,201 | 3/1994 | Tesker .................................. 460/116 |

*Primary Examiner*—J. J. Swann
*Assistant Examiner*—Avraham Lerner
*Attorney, Agent, or Firm*—King and Schickli

[57] ABSTRACT

A drive system is provided including first and second primary drive motors that are connected to drive opposing wheels at one end of a vehicle. Each primary drive motor is connected to and drives a variable displacement hydraulic pump. Each pump is connected via a separate hydraulic drive circuit to at least one hydraulic motor. The hydraulic drive motors drive opposing wheels at a second, opposite end of the vehicle.

9 Claims, 3 Drawing Sheets

VEHICLE DRIVE SYSTEM

TECHNICAL FIELD

The present invention relates generally to the vehicle drive system field and, more particularly, to a novel drive system of relatively straightforward structure including a hydraulic assist drive subsystem that may be selectively activated to enhance traction under certain operating conditions and thereby improve vehicle performance.

BACKGROUND OF THE INVENTION

Drive systems incorporating assist subsystems are well known in the art. For example, U.S. Pat. No. 3,811,525 to Stuart discloses a single electric or internal combustion drive motor connected through a transmission, clutch and gearing to a hydraulic pump. The pump is connected by a "closed" loop circuit to two fluid motors. The drive motor drives the rear wheels of the vehicle while the fluid motors drive the front wheels of the vehicle.

U.S. Pat. No. 4,570,741 to McCoy discloses a similar drive system but instead of one drive motor a pair of electric or internal combustion drive motors are provided with each operatively connected through a pump and hydraulic circuit to a fluid drive motor.

U.S. Pat. Nos. 4,470,475 to Carlson; 3,303,901 to Schou and 4,883,141 to Walker all disclose crossover drive systems. In Carlson, a diesel engine drives two variable displacement hydraulic fluid pumps. The pumps each in turn drive a pair of hydraulic motors. One pump drives the left front and right rear wheels while the other pump drives the right front and left rear wheels. In Schou an internal combustion engine drives a pump 14 that in turn drives four hydraulic motors. The hydraulic motors are diagonally, series connected in pairs. The Walker patent discloses a crossover or diagonal drive system including rotary hydraulic pumps that are connected to the mechanically driven front wheels. The pumps drive the hydraulic motors operatively connected to the diagonally opposed rear wheels.

U.S. Pat. Nos. 3,361,223 to Bauer and Re. 28,324 to Greene are also of interest. Both of these patents disclose hydraulic drive circuits utilizing variable displacement pumps. This eliminates the need for a clutch mechanism between the drive motor and the pumps.

The above drive systems all incorporate hydraulic drive mechanisms or subsystems. In some, such as the McCoy '741 patent, the hydraulic drive subsystem is an assist drive that may be selectively activated to increase the traction of the vehicle under adverse operating conditions such as found, for example, at construction sites, mines and quarries, particularly following rainfall. It should be appreciated, however, that still further improvements in overall vehicle performance, traction, pulling power and operating efficiency are desired.

SUMMARY OF THE INVENTION

Accordingly, it is a primary object of the present invention to provide a novel drive system for a wheeled vehicle of relatively simple, straightforward and inexpensive construction, requiring a minimum of overall maintenance while providing more efficient operation over a prolonged service life.

Yet another object of the present invention is to provide a drive system incorporating a unique arrangement of electric drive motors in a primary drive subsystem operating in cooperation with hydraulic pumps and hydraulic motors in twin hydraulic drive circuits of an assist drive subsystem that provides better traction in adverse operating conditions so as to enhance overall vehicle performance and pulling/hauling capacity.

Another object of the present invention is to provide a wheeled vehicle incorporating an improved, high-performance drive system.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a novel drive system is provided for furnishing enhanced performance to a vehicle. The drive system includes a first primary drive motor and gear assembly connected to drive a first wheel adjacent a first end on a first side of the vehicle. A second primary drive motor and gear assembly, identical to the first, is connected to drive a second wheel, adjacent to the first end on a second, opposite side of the vehicle. Thus, for example, the first and second primary drive motors and cooperating gear assemblies drive, respectfully, the left front and right front wheels of the vehicle.

A first hydraulic pump is operatively connected to the first primary drive motor. A first hydraulic motor is connected to drive a third wheel adjacent a second end on the second side of the vehicle. Thus, in the example, the first hydraulic motor drives the right rear wheel. A first hydraulic drive circuit connects the first hydraulic pump and first hydraulic motor to provide for operation thereof.

A second hydraulic pump, identical to the first hydraulic pump, is operatively connected to the second primary drive motor. A second hydraulic motor, identical to the first hydraulic motor, is connected to drive a fourth wheel adjacent to the second end on the first side of the vehicle. In the example, this is the left rear wheel. A second hydraulic drive circuit connects the second hydraulic pump with the second hydraulic motor to provide operation thereof.

Of course, the drive system also includes a control means for controlling the operation of the drive system. More particularly, the control means includes a primary drive control means for controlling operation of the first and second primary drive motors that form the primary drive subsystem and an assist drive control means for controlling the operation of the first and second hydraulic pumps as well as first and second valve banks provided, respectively, in the first and second hydraulic drive circuits. In this way, the assist drive control means provides control of the first and second hydraulic motors of the assist drive subsystem.

In accordance with a further aspect of the present invention, it should be appreciated that the first and second hydraulic pumps are preferably variable volume or displacement pumps. In this way, it is possible to eliminate the need to incorporate a clutch mechanism between the gear assembly and pumps. Preferably, the variable displacement pumps may be selectively adjusted for zero displacement operation. This is desirable under normal operating conditions when the main or primary drive provided through the primary drive motors and the first and second wheels provides sufficient traction to allow the desired operation of the wheeled vehicle. Under these conditions, the assist drive subsystem remains disengaged. Hence, no energy is wasted in operating the pumps to pump hydraulic fluid. This is a particularly important feature when operating a battery powered vehicle as it conserves battery energy, thereby allowing the vehicle to be operated over a longer period of time between battery charging or battery changing.

In accordance with a further aspect of the present invention, the hydraulic assist drive subsystem may also include a third hydraulic motor connected to drive a fifth wheel adjacent to the second end on the second side of the vehicle: that is, adjacent the third wheel. The third hydraulic motor is preferably connected in the first hydraulic drive circuit so as to be driven in parallel with the first hydraulic motor. Additionally, the drive system may include a fourth hydraulic motor connected to drive a sixth wheel adjacent to the second end on the first side of the vehicle: that is, adjacent to the fourth wheel. The fourth hydraulic motor is connected in the second hydraulic drive circuit and is preferably driven in parallel with the second hydraulic motor. In accordance with this embodiment of the invention, the advantages inherent in a crossover drive system are combined with the advantages inherent in a tandem assist drive system. More specifically, that is, where the powered first or second wheels lose traction and begin slipping, engagement of the assist drive subsystem functions to direct power to the rear wheels for improved traction. As a result, vehicle performance is enhanced. Of course, this effect is multiplied by the additional grip provided with the second set of wheels driven through the hydraulic drive circuits in the assist drive subsystem.

In accordance with an alternative embodiment of the present invention, the third hydraulic motor is connected in the second hydraulic circuit while the fourth hydraulic motor is connected in the first hydraulic circuit. In this arrangement, each primary motor at a first end of the vehicle drives one wheel on each side of the vehicle at an opposite end. This arrangement provides even distribution of assist power in applications where such an arrangement is preferred.

In accordance with yet another aspect of the present invention, a wheeled vehicle is provided incorporating any one of the hydraulic drive systems being described.

Still other objects of the present invention will become apparent to those skilled in this art from the following description wherein there is shown and described alternative preferred embodiments of this invention, simply by way of illustration of three modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiments of the invention, examples of which are illustrated in the accompanying drawing.

DETAILED DESCRIPTION OF THE INVENTION

Figure 1:
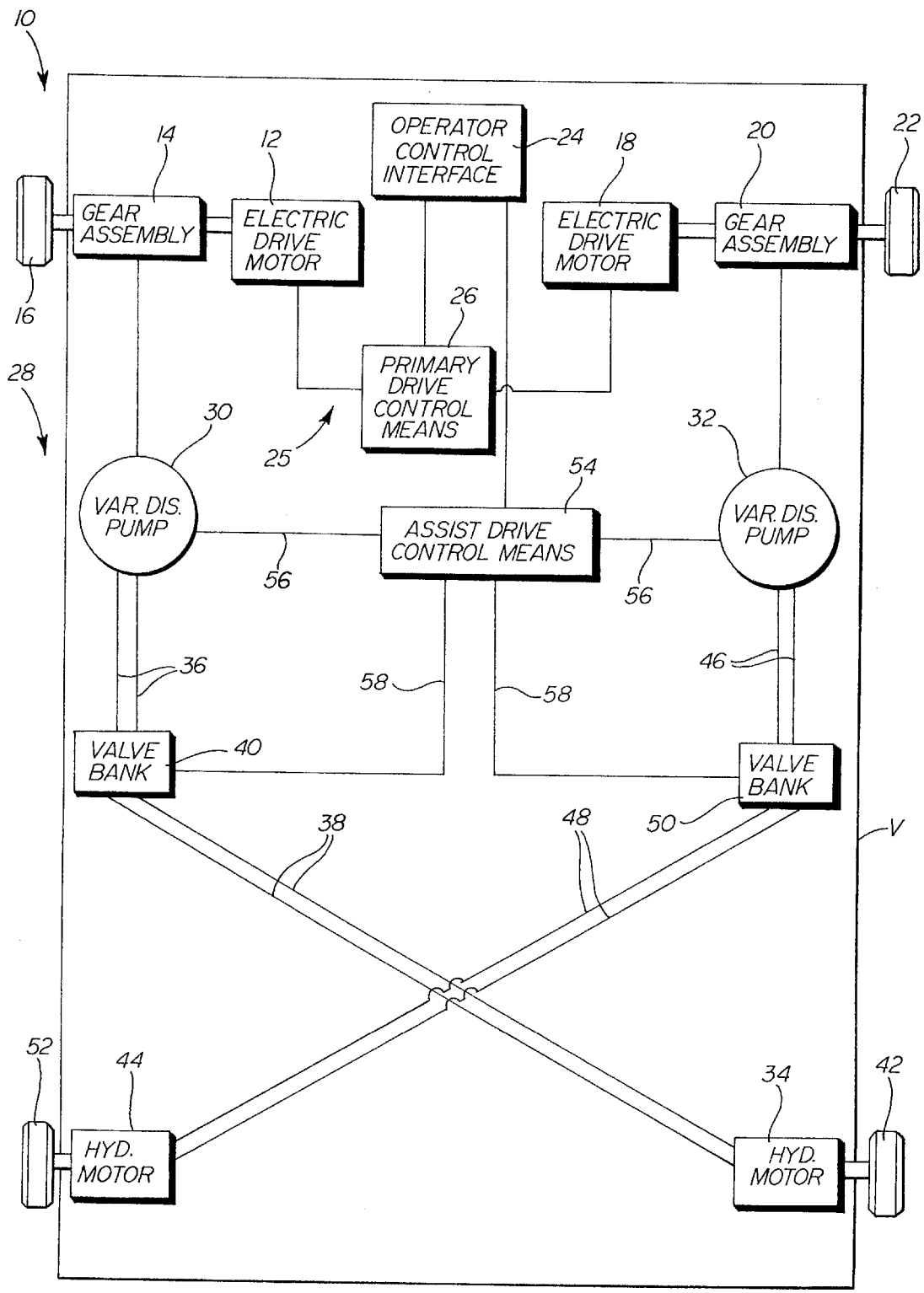
FIG. 1 is a schematic block diagram showing a first embodiment of the drive system of the present invention.

Reference is now made to FIG. 1 showing a first embodiment of a drive system 10 of the present invention. This drive system 10 is specifically adapted to be selectively engaged to provide power drive to additional wheels and thereby increase the traction of the wheeled vehicle (not shown) in which it is installed. Accordingly, it should be appreciated that this invention has particular application to industrial equipment such as fork lift trucks, construction equipment and mining vehicles that are typically operated under heavy load conditions and in environments where reduced traction conditions are often encountered.

As shown in FIG. 1, the drive system 10 includes a first primary drive motor 12 with a transmission operatively connected through gear assembly 14 to drive a first wheel 16. The wheel 16 is positioned adjacent a first end on a first side of the vehicle V such as the left front wheel as shown in FIG. 1. Similarly, a second primary drive motor 18, identical to the first drive motor 12, includes a transmission and is operatively connected through the gear assembly 20 to drive a second wheel 22. The second wheel 22 is positioned adjacent a first end on a second side of the vehicle V such as the right front wheel shown in FIG. 1. Preferably, the primary drive motors 12, 18 are electric motors as described herein although in some applications they may be of the internal combustion variety.

The electric motors 12 and 18 are controlled by the vehicle operator through an operator control interface 24 and a primary drive control means 26. As is well known in the art, the operator control interface 24 may, for example, include a gear shift controller and an accelerator pedal or lever while the control means 26 may, for example, include a series of batteries to provide power and appropriate speed control circuitry. Under normal operating conditions, the electric drive motors 12, 18 and the components described above in association therewith are the sole source of motive power for moving the vehicle V in a controlled manner. Hence, the electric drive motors 12, 18 gear assemblies 14, 20 and control means 26 may be considered the primary drive subsystem 25.

As further shown in FIG. 1, the vehicle V also incorporates a hydraulic assist drive subsystem, generally designated by reference numeral 28. The hydraulic assist drive subsystem 28 includes a first variable displacement pump 30 that is operatively connected by means of a power take-off to the gear assembly 14 and a second variable displacement pump 32 that is operatively connected also by power take-off to the gear assembly 20. As further shown, the first variable displacement pump 30 is operatively connected to a first hydraulic motor 34 through a first hydraulic drive circuit including fluid lines 36, 38 and first valve bank 40. As should be appreciated, the first hydraulic motor 34 is connected to drive a third wheel 42 adjacent a second end on the second side of the vehicle, such as the right rear wheel as shown in FIG. 1.

Similarly, the second variable displacement pump 32 is connected to a second hydraulic motor 44 through a second hydraulic drive circuit including fluid lines 46, 48 and second valve bank 50. As shown the second hydraulic motor 44 is connected to drive a fourth wheel 52 adjacent a second end on the first side of the vehicle V such as the left rear wheel as shown in FIG. 1.

As should be appreciated, the hydraulic assist drive subsystem 28 may be operated by the vehicle operator through the operator control interface 24 and the assist drive control means 54. More specifically, the operator control interface 24 may, for example, include an actuator lever that may be manipulated to engage the hydraulic assist drive subsystem 28 at times when additional tractive force is desired. The hydraulic control means 54 may, for example, include a relatively low pressure pump (not shown) that delivers fluid through lines 56 to control the displacement of the variable displacement pumps 30, 32 and fluid through the lines 58 to control the operation of the first and second valve banks 40, 50.

More particularly, the vehicle V is normally powered exclusively through the primary drive subsystem 25 including the electric drive motors 12, 18. During such times the hydraulic assist drive system 28 remains disengaged with the variable displacement pumps 30, 32 of the assist drive subsystem providing zero displacement operation. Advantageously, the zero displacement operation of the pumps 30, 32 essentially eliminates piston movement and thereby minimizes the power drain on the batteries powering the vehicle. Accordingly, the service time provided on each charge or set of batteries is maximized. The use of the variable displacement pumps 30, 32 also has the further benefit of eliminating the need for any clutch between the pumps 30, 32 and the gear assemblies 18, 20, respectively. Thus, this mechanical structure is eliminated thereby reducing maintenance requirements. There is also some space and weight saving as well. These are important considerations in, for example, an underground mining vehicle where the provision of a low profile machine for operation in thin seams is a vital consideration to the overall design.

Of course, when the assist drive subsystem 28 is disengaged it should also be appreciated that the valve banks 40, 50 function to provide free wheeling operation. More specifically, the lines 38 are connected by the valve bank 40 in a closed loop including the hydraulic motor 34 to allow the motor 34 to turn freely and the wheel 42 to "free wheel". Simultaneously, the lines 48 are connected by the valve bank 50 in a closed loop including the hydraulic motor 44 to allow the motor 44 to turn freely and the wheel 52 to "free wheel". The lines 36 and 46 leading from the pumps 30, 32 respectively are also close looped by the valves 40, 50 to prevent any potential fluid pressure buildup and provide for proper system operation. Hydraulic fluid for the operation of the assist drive subsystem 28 is, of course, drawn from and returned to a supply tank or sump (not shown) as necessary to provide for smooth operation and pressure relief in a manner well known in the art of hydraulic drive systems.

When conditions require, the vehicle operator may engage the hydraulic assist drive subsystem 28 through manipulation of the operator control interface 24. The hydraulic control means 54 responds to the operator input from the control interface 24. Specifically, hydraulic fluid is delivered through the lines 56 to reset the variable displacement pumps 30, 32 to a positive displacement setting. Simultaneously, hydraulic fluid is delivered through the lines 58 to the first and second valve banks 40, 50. Specifically, the valve bank 40 is actuated so that the lines 36 and 38 are interconnected for the delivery of hydraulic fluid from the variable displacement pump 30 to the hydraulic motor 34. Similarly, the valve bank 50 is activated so that the lines 46 and 48 are interconnected and hydraulic fluid is delivered from the variable displacement pump 32 to the second hydraulic motor 44. The hydraulic motors 34, 44 drive, respectively, the wheels 42, 52. The wheels 42, 52 are, of course, in engagement with the ground and, therefore, provide additional traction for powering the vehicle V.

Further, it should be appreciated that the hydraulic assist drive subsystem 28 is of the crossover or diagonal variety. That is, the electric drive motor 12 that drives the wheel 16 at one end and one side of the vehicle V also drives the variable displacement pump 30 that operates through the first hydraulic circuit to drive the first hydraulic motor 34 at the opposite end and opposite side of the vehicle. Similarly, the electric drive motor 18 that drives the wheel 22 also drives the variable displacement pump 32 that operates through the second hydraulic drive circuit to drive the hydraulic motor 44 driving the wheel 52 at the opposite end and opposite side of the vehicle V.

This drive arrangement has a number of specific advantages. Perhaps the most important is the selective application of the greatest power generated by the assist subsystem 28 to the side of the vehicle V where the best conditions for traction exist. For example, in a situation where the wheel 16 loses traction relative to the wheel 22, the load on the electric drive motor 12 relative to the electric drive motor 18 is smaller. As a result, the electric drive motor 12 operates at a faster speed. With the hydraulic assist drive subsystem 28 engaged, this results in the variable displacement pump 30 being driven at a higher speed than the variable displacement pump 32. As a result, the hydraulic motor 34 drives the wheel 42 at a higher speed and with greater power than the hydraulic motor 44 drives the wheel 52. With the crossover drive arrangement, the greater application of power is, therefore, being delivered through the wheel 42 on the side of the vehicle where the better traction conditions exist. Accordingly, the performance of the vehicle V is enhanced and the load bearing capacity of the vehicle is maintained even under adverse operating conditions. Such a crossover drive arrangement is, of course, particularly effective in coal mining applications where underground water often has a tendency to pool on one side of a haulway, reducing traction on one side thereof more than the other.

Figure 2:
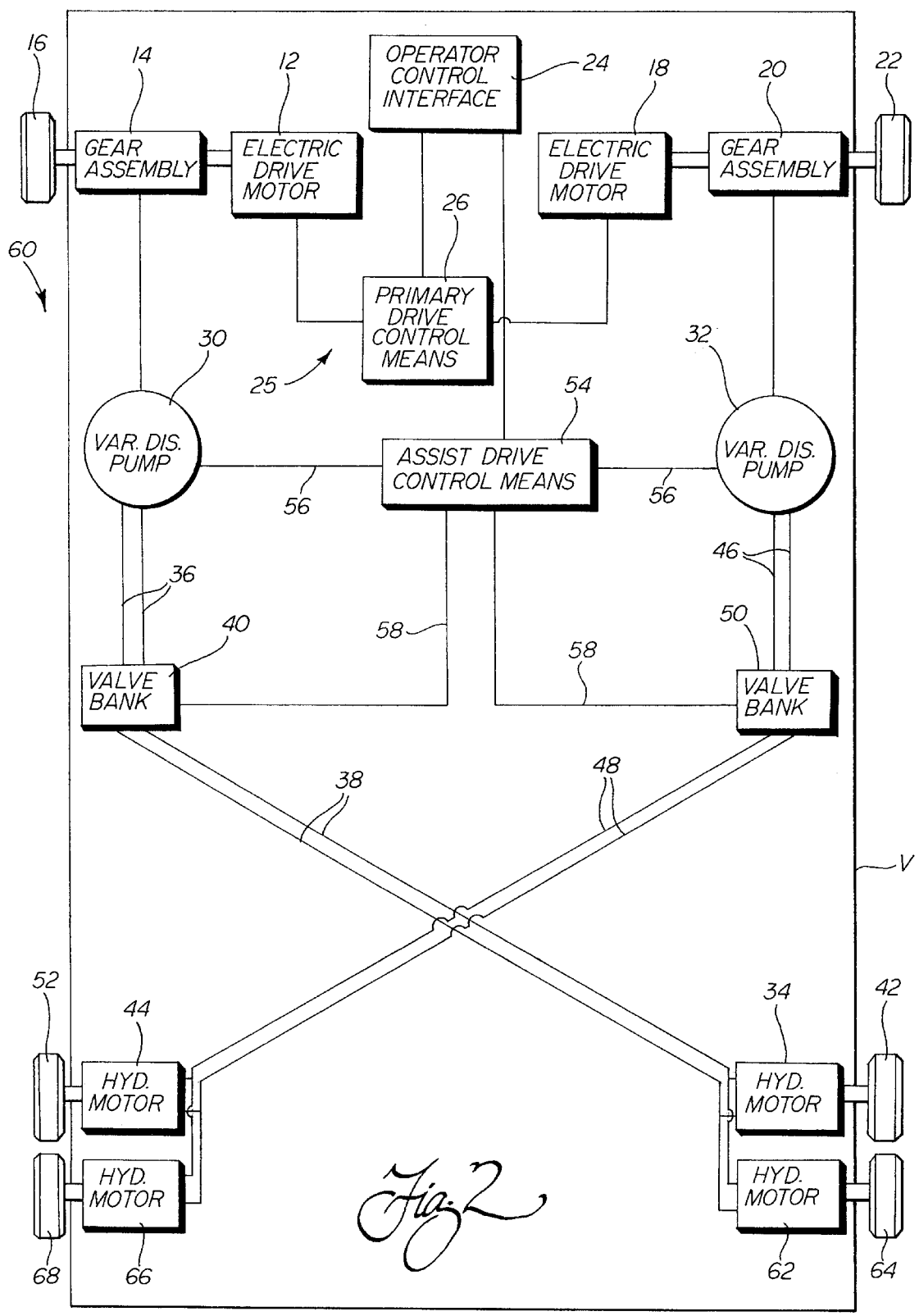
FIG. 2 is a schematic block diagram showing a second embodiment of the drive system of the present invention.

A second embodiment of the drive system 10 is shown in FIG. 2. This embodiment is substantially similar to FIG. 1 but incorporates a tandem hydraulic assist drive subsystem 60.

As should be appreciated, the embodiment shown in FIG. 2 differs from the embodiment shown in FIG. 1 only by the addition of the third hydraulic motor 62 for driving the fifth wheel 64 and the fourth hydraulic motor 66 for driving the sixth wheel 68. The remaining structure is identical to that shown in FIG. 1 and, accordingly, FIG. 2 incorporates the same reference numerals.

As should be appreciated, the third hydraulic motor 62 is operatively connected to the variable displacement pump 30 through the first hydraulic drive circuit (lines 36, 38 and valve bank 40). As shown, the first hydraulic motor 34 and third hydraulic motor 62 are driven in parallel so that the adjacent third wheel 42 and fifth wheel 64 are driven in like manner.

Similarly, the second hydraulic motor 44 and fourth hydraulic motor 66 are both connected in parallel to the variable displacement pump 32 through the second hydraulic drive circuit (lines 46, 48 and valve bank 50). As a result, the adjacent fourth wheel 52 and the sixth wheel 68 are driven together in like manner. Of course, as the embodiment shown in FIG. 2 incorporates a tandem hydraulic assist drive subsystem 60, it should be appreciated that two additional wheels 64, 68 are driven when the assist drive subsystem is engaged. As a result, a greater number of wheels are in contact with the ground providing frictional engagement and the transmission of tractive force. Overall vehicle traction is therefore improved over the embodiment shown in FIG. 1 in most operating conditions.

Figure 3:
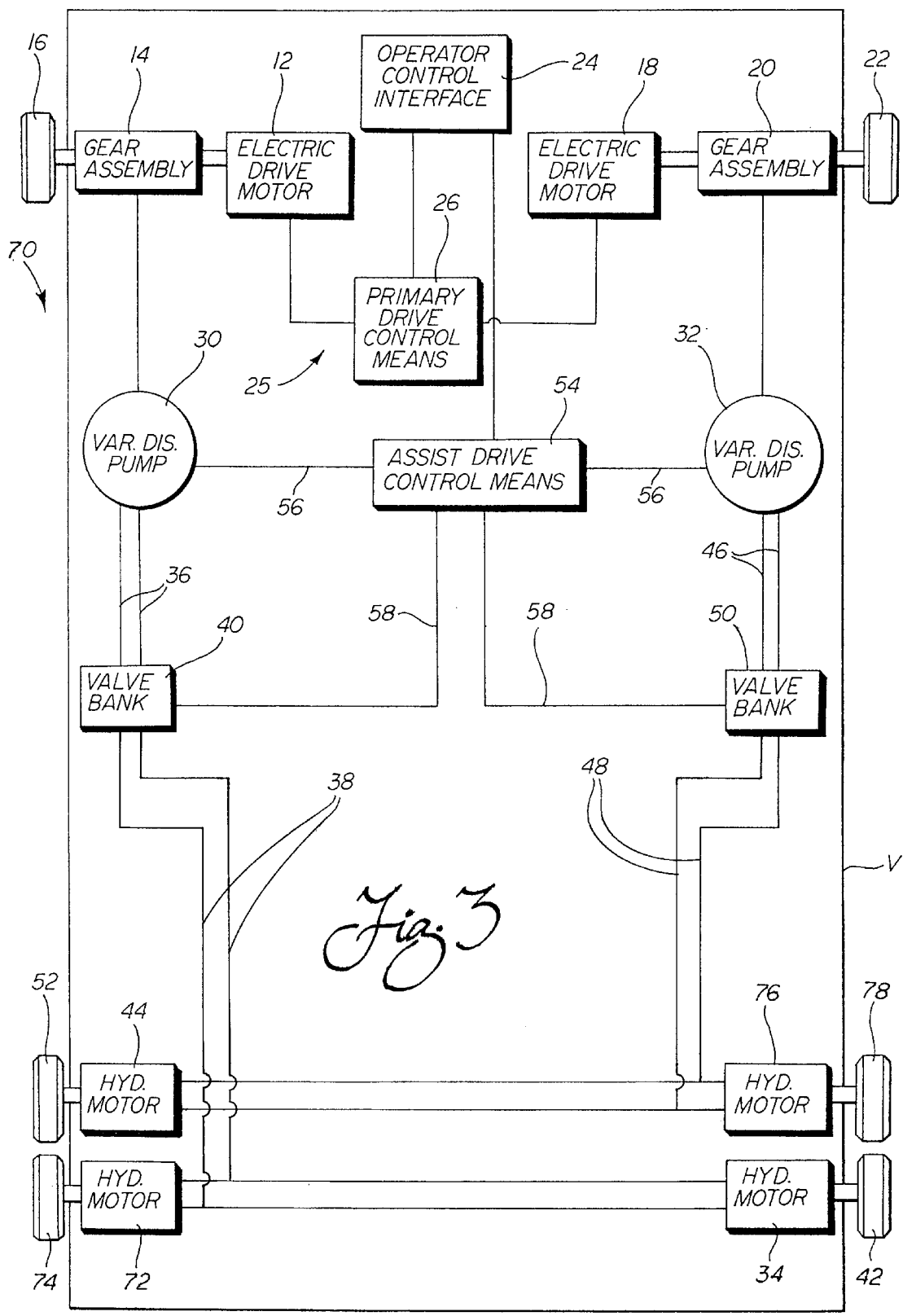
FIG. 3 is a schematic block diagram showing a third embodiment of the drive system of the present invention.

Reference is now made to FIG. 3 showing a third embodiment of the present invention. More specifically, the third embodiment incorporates a tandem hydraulic assist drive subsystem 70 that differs from the tandem hydraulic assist drive subsystem 60 shown in FIG. 2.

As should be appreciated from a review of FIG. 3, the same basic structure shown and described in FIG. 1 is adopted with like components identified by identical reference numerals. The third embodiment differs from the first embodiment simply by the provision of a third hydraulic motor 72 that is driven by the variable displacement pump 30 through the first hydraulic drive circuit including fluid lines 36, 38 and valve bank 40. The third hydraulic motor 72 drives the fifth wheel 74. As should be appreciated, the fifth wheel 74 is mounted on the first side of the vehicle at the second end. Thus, the fifth wheel 74 is on the same side of the vehicle as the first wheel 16 driven by the electric drive motor 12. This side is opposite to the third wheel 42 driven by the first hydraulic motor 44.

Additionally, the third hydraulic assist drive subsystem 70 includes a fourth hydraulic motor 76 driven by the variable displacement pump 32 through the second hydraulic drive circuit including the lines 46, 48 and the valve bank 50. In turn, the fourth hydraulic motor 76 drives the sixth wheel 78. The sixth wheel 78 is positioned on the second side at the second end of the vehicle V. That is the sixth wheel 78 is on the same side of the vehicle as the second wheel 22 and is opposite to the fourth wheel 52. Thus, it should be appreciated that the variable displacement pump 32 drives hydraulic motors 44 and 76 which drive wheels 52 and 78 on opposite sides of the vehicle.

The third hydraulic assist drive subsystem 70 shown in FIG. 3 represents a hybrid of a crossover and standard drive system. More specifically, each variable displacement pump 30, 32 drives a wheel on each side of the vehicle V (i.e. pump 30 drives wheels 42 and 74 via hydraulic motors 34 and 72 and pump 32 drives wheels 52 and 78 via hydraulic motors 44 and 76). This arrangement provides even power distribution at the rear end of the vehicle V while providing tandem driven wheels on each side to increase the surface area of wheel contact with the ground and thereby spread vehicle load and improve traction.

In summary, numerous benefits results from employing the concepts of the present invention. A simple, reliable and responsive assist drive system is provided in various embodiments 28, 60, 70. Each relies upon variable displacement pumps 30, 32 that eliminate the need for a clutching mechanism while having a zero displacement setting that saves power. This is a particularly important consideration in a battery operated vehicle. Each also provides the unique benefits of a crossover drive system which is specifically adapted to provide the greatest level of assist power to the side of the vehicle where the better traction conditions exist. This significantly benefits vehicle performance.

The foregoing description of three preferred embodiments of the invention has been presented for purposes of illustration and description. It is not intended to be exhaustive or to limit the invention to the precise form disclosed. Obvious modifications or variations are possible in light of the above teachings. For example, the hydraulic drive motors in the second and third embodiments could be connected in a serial arrangement rather than the parallel arrangement shown. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A drive system for a wheeled vehicle, comprising:

a first primary drive motor and gear assembly connected to drive a first wheel adjacent a first end on a first side of the vehicle;

a second primary drive motor and gear assembly connected to drive a second wheel adjacent a first end on a second side of the vehicle;

a first hydraulic pump operatively connected to and driven by said first primary drive motor;

a first hydraulic motor connected to drive a third wheel adjacent a second end on the second side of the vehicle;

a first hydraulic drive circuit connecting said first hydraulic pump and said first hydraulic motor, said first hydraulic drive circuit including a first valve bank;

a second hydraulic pump operatively connected to and driven by said second primary drive motor;

a second hydraulic motor connected to drive a fourth wheel adjacent the second end on the first side of the vehicle;

a second hydraulic drive circuit connecting said second hydraulic pump and said second hydraulic motor, said second hydraulic drive circuit including a second valve bank;

a primary drive controller for controlling operation of said first and second primary drive motors; and an assist drive controller for controlling operation of said first and second hydraulic pumps and said first and second valve banks, thereby providing control of said first and second hydraulic motors.

2. The drive system set forth in claim 1, further including (a) a third hydraulic motor connected to drive a fifth wheel adjacent the second end on the second side of the vehicle, said third hydraulic motor being connected in said first hydraulic drive circuit; and (b) a fourth hydraulic motor connected to drive a sixth wheel adjacent the second end on the first side of the vehicle, said fourth hydraulic motor being connected in said second hydraulic drive circuit.

3. A wheeled vehicle incorporating the drive system set forth in claim 1.

4. A drive system for a wheeled vehicle, comprising:

a first primary drive motor and gear assembly connected to drive a first wheel adjacent a first end on a first side of the vehicle;

a second primary drive motor and gear assembly connected to drive a second wheel adjacent a first end on a second side of the vehicle;

a first variable displacement hydraulic pump operatively connected to and driven by said first primary drive motor;

a first hydraulic motor connected to drive a third wheel adjacent a second end on the second side of the vehicle;

a first hydraulic drive circuit connecting said first hydraulic pump and said first hydraulic motor, said first hydraulic drive circuit including a first valve bank;

a second variable displacement hydraulic pump operatively connected to and driven by said second primary drive motor;

a second hydraulic motor connected to drive a fourth wheel adjacent the second end on the first side of the vehicle;

a second hydraulic drive circuit connecting said second hydraulic pump and said second hydraulic motor, said second hydraulic drive circuit including a second valve bank;

a primary drive controller for controlling operation of said first and second primary drive motors; and an assist drive controller for controlling operation of said first and second hydraulic pumps and said first and second valve banks, thereby providing control of said first and second hydraulic motors.

5. The drive system set forth in claim 4, further including (a) a third hydraulic motor connected to drive a fifth wheel adjacent the second end on the second side of the vehicle, said third hydraulic motor being connected in said first hydraulic drive circuit; and (b) a fourth hydraulic motor connected to drive a sixth wheel adjacent the second end on the first side of the vehicle, said fourth hydraulic motor being connected in said second hydraulic drive circuit.

6. A wheeled vehicle incorporating the drive system set forth in claim 4.

7. A drive system for a wheeled vehicle, comprising:

a first primary drive motor and gear assembly connected to drive a first wheel adjacent a first end on a first side of the vehicle;

a second primary drive motor and gear assembly connected to drive a second wheel adjacent a first end on a second side of the vehicle;

a first hydraulic pump operatively connected to and driven by said first primary drive motor;

a first hydraulic motor connected to drive a third wheel adjacent a second end on the second side of the vehicle;

a first hydraulic drive circuit connecting said first hydraulic pump and said first hydraulic motor;

a second hydraulic pump operatively connected to and driven by said second primary drive motor;

a second hydraulic motor connected to drive a fourth wheel adjacent the second end on the first side of the vehicle;

a second hydraulic drive circuit connecting said second hydraulic pump and said second hydraulic motor;

a third hydraulic motor connected to drive a fifth wheel adjacent the second end on the second side of the vehicle, said third hydraulic motor being connected in said second hydraulic circuit;

a fourth hydraulic motor connected to drive a sixth wheel adjacent the second end on the first side of the vehicle, said fourth hydraulic motor being connected in said first hydraulic circuit; and a controller for controlling operation of said first and second primary drive motors, first and second hydraulic pumps and said first, second, third and fourth hydraulic motors.

8. A wheeled vehicle incorporating the drive system set forth in claim 7.

9. The drive system set forth in claim 7, wherein said first and second hydraulic pumps are variable displacement pumps.

\* \* \* \* \*